G. S. LEWIS.
CYCLE FRAME CONSTRUCTION.
APPLICATION FILED JUNE 23, 1919.

1,435,611. Patented Nov. 14, 1922.

Inventor,
George S. Lewis,
By Dyrenforth, Lee, Chritton & Wiles
Att'ys

Patented Nov. 14, 1922.

1,435,611

UNITED STATES PATENT OFFICE.

GEORGE S. LEWIS, OF OAK PARK, ILLINOIS, ASSIGNOR TO MEAD CYCLE COMPANY, OF CHICAGO, ILLINOIS.

CYCLE-FRAME CONSTRUCTION.

Application filed June 23, 1919. Serial No. 306,109.

*To all whom it may concern:*

Be it known that I, GEORGE S. LEWIS, a citizen of the United States, residing at Oak Park, in the county of Cook and State of Illinois, have invented a new and useful Improvement in Cycle-Frame Constructions, of which the following is a specification.

My invention relates, more particularly, to improvement in the rear-fork-end members of cycle-frames and more especially bicycle frames; and my object, generally stated, is to provide a novel, simple and economical construction of such a member which will present the advantages of such members when made of forgings.

Referring to the accompanying drawing:—

Figure 1:
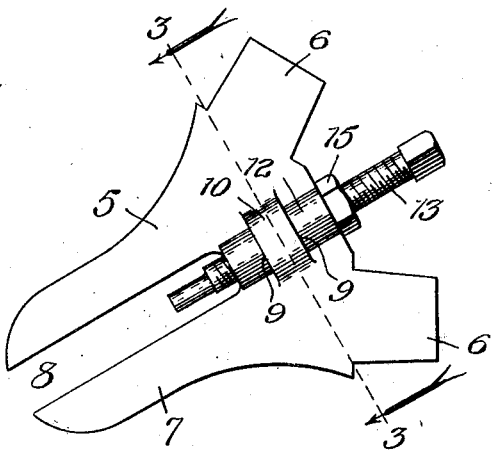
Figure 3:
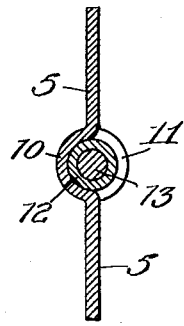
Figure 2:
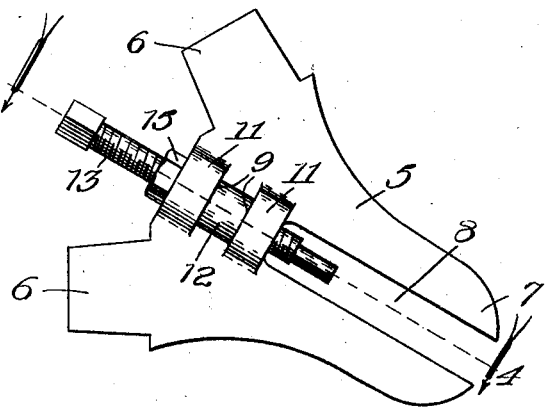
Figure 4:
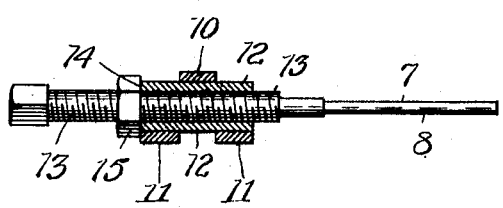

Fig. 1 is a view in side elevation of a rear-fork-end member constructed in accordance with my invention. Fig. 2 is a similar view of the opposite side thereof. Fig. 3 is a section taken at the line 3—3 on Fig. 1 and viewed in the direction of the arrows; and Fig. 4, a section taken at the line 4—4 on Fig. 2 and viewed in the direction of the arrows.

According to the particular illustrated embodiment of my invention, the rear-fork-end member is formed of a plate 5 stamped into the form shown to form the divergent lugs 6 for insertion into the open ends of the tubular frame-members at the rear end of the bicycle frame, to which they are rigidly secured as by brazing; and to form the longitudinally slotted rearwardly-extending portion 7, the slot 8 of which receives the axle (not shown) of the rear wheel of the bicycle. Between the ends of the plate 5 the metal thereof is slit along the lines 9 crosswise of the median line of the slot 8, the metal between the slits 9 being offset laterally from the plate in one direction to present the semi-circular strap-portion 10 and the metal at opposite sides of the portion 10 deflected from the plate in the opposite direction to present the semi-circular strap-portions 11, the straps 10 and 11 being provided for receiving a tubular member 12, as for example of steel, and which is internally threaded to engage the threads of an adjusting-screw device, as for example as shown at 13 and of common construction.

In the manufacture of the member the tube 12 is positioned in the straps 10 and 11 and the parts then, by preference, secured together, as by brazing, which may be effected in the operation of brazing the plate 5, at its lugs 6, to the hollow ends of the frame, (not shown) and after this operation the tube 12 tapped to form the internal threads.

It will be noted that not only is the plate member produced according to my invention simple, strong and economical of construction, but continuous threads for engagement by the usual adjusting screw are provided, and a circular surface 14 at the forward end of the member is provided permitting a lock-nut as represented at 15, to be used on the screw 13, the nut bearing against the circular surface referred to. Furthermore the operation of forming the threads on the inner surface of the tube 12 may be readily and economically effected by the simple operation of tapping the tube.

While I have illustrated and described a particular embodiment of my invention I do not wish to be understood as intending to limit it thereto as the same may be variously modified and altered without departing from the spirit of my invention.

What I claim as new and desire to secure by Letters Patent is:

1. A rear-fork-end member formed of a plate having a portion thereof deflected and forming with the remainder of the plate an opening in the plate, and a tube extending lengthwise of said plate and the walls of said opening and located, and brazed, in said opening for receiving an adjusting device.

2. A rear-fork-end member formed of a plate having a portion thereof deflected and forming with the remainder of the plate an opening in the plate, and an internally threaded tube secured in said opening for receiving an adjusting screw, said tube being overlapped by said deflected portion at one side of said tube at a surface extending lengthwise of said plate and at its opposite side by another portion of said plate.

3. A rear-fork-end member formed of a plate having portions thereof deflected in opposite directions and forming an opening in the plate, one of said portions being intermediate the ends of said plate, and an internally screw threaded tube extending into and secured within said opening for receiving an adjusting device, said tube being overlapped by said deflected portions at its opposite sides at surfaces extending lengthwise of said plate.

GEORGE S. LEWIS.